US012589957B2

(12) United States Patent
Weinstein et al.

(10) Patent No.: US 12,589,957 B2
(45) Date of Patent: Mar. 31, 2026

(54) MOBILE SELECTIVE CATALYTIC REDUCTION SYSTEMS AND METHODS FOR THE SAME

(71) Applicant: SOLARIS OILFIELD SITE SERVICES OPERATING LLC, Houston, TX (US)

(72) Inventors: Jeremy Weinstein, Tomball, TX (US); Scott Lambert, The Woodlands, TX (US); Michael Torres, Houston, TX (US); Whitney Jordan Salinas, Brownwood, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 0 days.

(21) Appl. No.: 19/345,209

(22) Filed: Sep. 30, 2025

(65) Prior Publication Data

US 2026/0021979 A1     Jan. 22, 2026

(51) Int. Cl.
| | |
|---|---|
| B65G 65/32 | (2006.01) |
| B65G 17/12 | (2006.01) |
| B65G 41/00 | (2006.01) |

(52) U.S. Cl.
CPC ........... B65G 65/32 (2013.01); B65G 17/126 (2013.01); B65G 41/002 (2013.01); B65G 41/008 (2013.01); B65G 2201/045 (2013.01)

(58) Field of Classification Search
CPC ... F01N 3/2066; F01D 15/10; B01D 53/8631; B01D 53/86; B60P 3/00
See application file for complete search history.

(56) References Cited

U.S. PATENT DOCUMENTS

| | | | |
|---|---|---|---|
| 10,634,029 B2 | 4/2020 | Czarnecki et al. | |
| 11,143,000 B2 * | 10/2021 | Li | H02K 7/1823 |
| 11,607,982 B2 * | 3/2023 | Tian | B60P 1/34 |
| 11,799,356 B2 * | 10/2023 | Morris | F01D 25/28 |

* cited by examiner

*Primary Examiner* — Timothy P. Kelly
(74) *Attorney, Agent, or Firm* — MH2 Technology Law Group, LLP

(57) ABSTRACT

A mobile selective catalytic reduction (SCR) system for a gas turbine includes a base trailer and a selective catalytic reduction duct assembly disposed on the base trailer. The selective catalytic reduction duct assembly is configured to be operably coupled with the gas turbine and receive exhaust from the gas turbine. The SCR system also includes a selective catalytic reduction stack configured to be disposed on the base trailer and operably coupled with the selective catalytic reduction duct assembly. The SCR system further includes a self-erecting trailer detachably coupled with the selective catalytic reduction stack and configured to position the selective catalytic reduction stack on the base trailer.

20 Claims, 7 Drawing Sheets

600

700

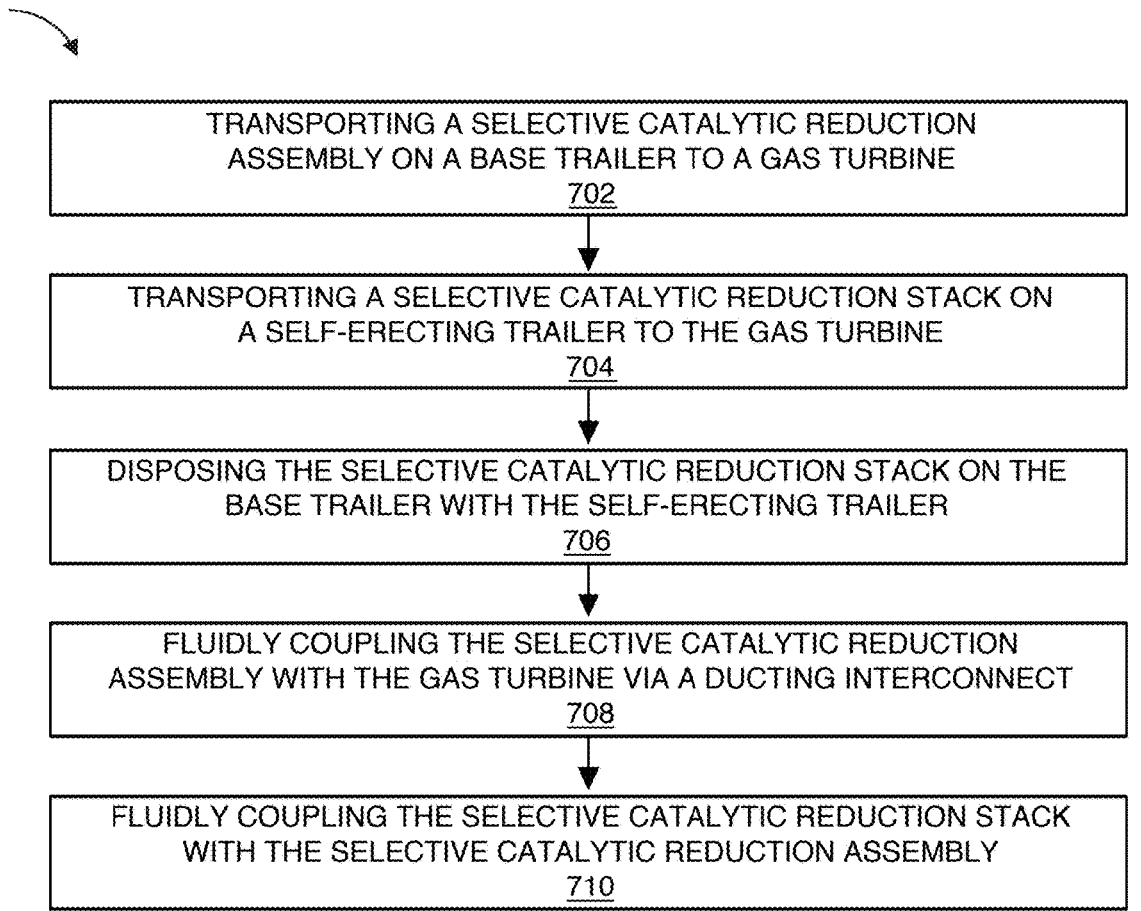

TRANSPORTING A SELECTIVE CATALYTIC REDUCTION
ASSEMBLY ON A BASE TRAILER TO A GAS TURBINE
702

TRANSPORTING A SELECTIVE CATALYTIC REDUCTION STACK ON
A SELF-ERECTING TRAILER TO THE GAS TURBINE
704

DISPOSING THE SELECTIVE CATALYTIC REDUCTION STACK ON THE
BASE TRAILER WITH THE SELF-ERECTING TRAILER
706

FLUIDLY COUPLING THE SELECTIVE CATALYTIC REDUCTION
ASSEMBLY WITH THE GAS TURBINE VIA A DUCTING INTERCONNECT
708

FLUIDLY COUPLING THE SELECTIVE CATALYTIC REDUCTION STACK
WITH THE SELECTIVE CATALYTIC REDUCTION ASSEMBLY
710

FIG. 7

MOBILE SELECTIVE CATALYTIC REDUCTION SYSTEMS AND METHODS FOR THE SAME

BACKGROUND

Selective Catalytic Reduction (SCR) systems are conventionally deployed with gas turbines in remote locations to reduce nitrogen oxides ($NO_x$) emissions generated during high-temperature combustion and thereby enable compliance with stringent environmental regulations. Conventional SCR systems used in power generation and industrial applications are permanently installed; and thus, often utilize structural steel supports, concrete foundations, and on-site assembly of components. Additionally, these systems demand site-specific engineering, extensive calibration, and integration with turbine exhaust ducting that often takes weeks to install and commission. Due to the constraints of being permanently installed, conventional SCR systems and the components thereof are often not suitable for mobile or temporary power applications that require rapid deployment, relocation, or modular reconfiguration.

What is needed, then, are mobile SCR systems and methods for the same.

SUMMARY

A mobile selective catalytic reduction (SCR) system for a gas turbine is disclosed. The SCR system includes a base trailer and a selective catalytic reduction duct assembly disposed on the base trailer. The selective catalytic reduction duct assembly is configured to be operably coupled with the gas turbine and receive exhaust from the gas turbine. The SCR system also includes a selective catalytic reduction stack configured to be disposed on the base trailer and operably coupled with the selective catalytic reduction duct assembly. The SCR system further includes a self-erecting trailer detachably coupled with the selective catalytic reduction stack and configured to position the selective catalytic reduction stack on the base trailer.

Another mobile selective catalytic reduction (SCR) system for a gas turbine is disclosed. The SCR system includes a base trailer and a selective catalytic reduction duct assembly integrally built with the base trailer. The selective catalytic reduction duct assembly is configured to be operably coupled with the gas turbine and receive exhaust from the gas turbine via an inlet thereof. The SCR system also includes a selective catalytic reduction stack configured to be disposed on the base trailer and operably coupled with the selective catalytic reduction duct assembly. The SCR system further includes a self-erecting trailer detachably coupled with the selective catalytic reduction stack. The self-erecting trailer is configured to position the selective catalytic reduction stack on the base trailer.

A method for operably coupling a mobile selective catalytic reduction (SCR) system with a gas turbine is disclosed. The method includes transporting a selective catalytic reduction assembly on a base trailer to the gas turbine. The base trailer includes a self-leveling system configured to facilitate the coupling between the SCR system and the gas turbine. The selective catalytic reduction assembly is integrally built with or permanently coupled with the base trailer. The method also includes transporting a selective catalytic reduction stack on a self-erecting trailer to the gas turbine. The selective catalytic reduction stack is transported on the self-erecting trailer in a horizontal orientation. The method further includes disposing the selective catalytic reduction stack on the base trailer with the self-erecting trailer. Disposing the selective catalytic reduction on the base trailer includes actuating a hoisting system integrally built with the self-erecting trailer to rotate the selective catalytic reduction stack from the horizontal orientation to a vertical orientation. Disposing the selective catalytic reduction on the base trailer also includes positioning the selective catalytic reduction stack on the base trailer in the vertical orientation. The method also includes fluidly coupling the selective catalytic reduction assembly with the gas turbine via a ducting interconnect. The method also includes fluidly coupling the selective catalytic reduction stack with the selective catalytic reduction assembly.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 7 illustrates a flowchart of a method for operably coupling a mobile selective catalytic reduction (SCR) system with a gas turbine, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
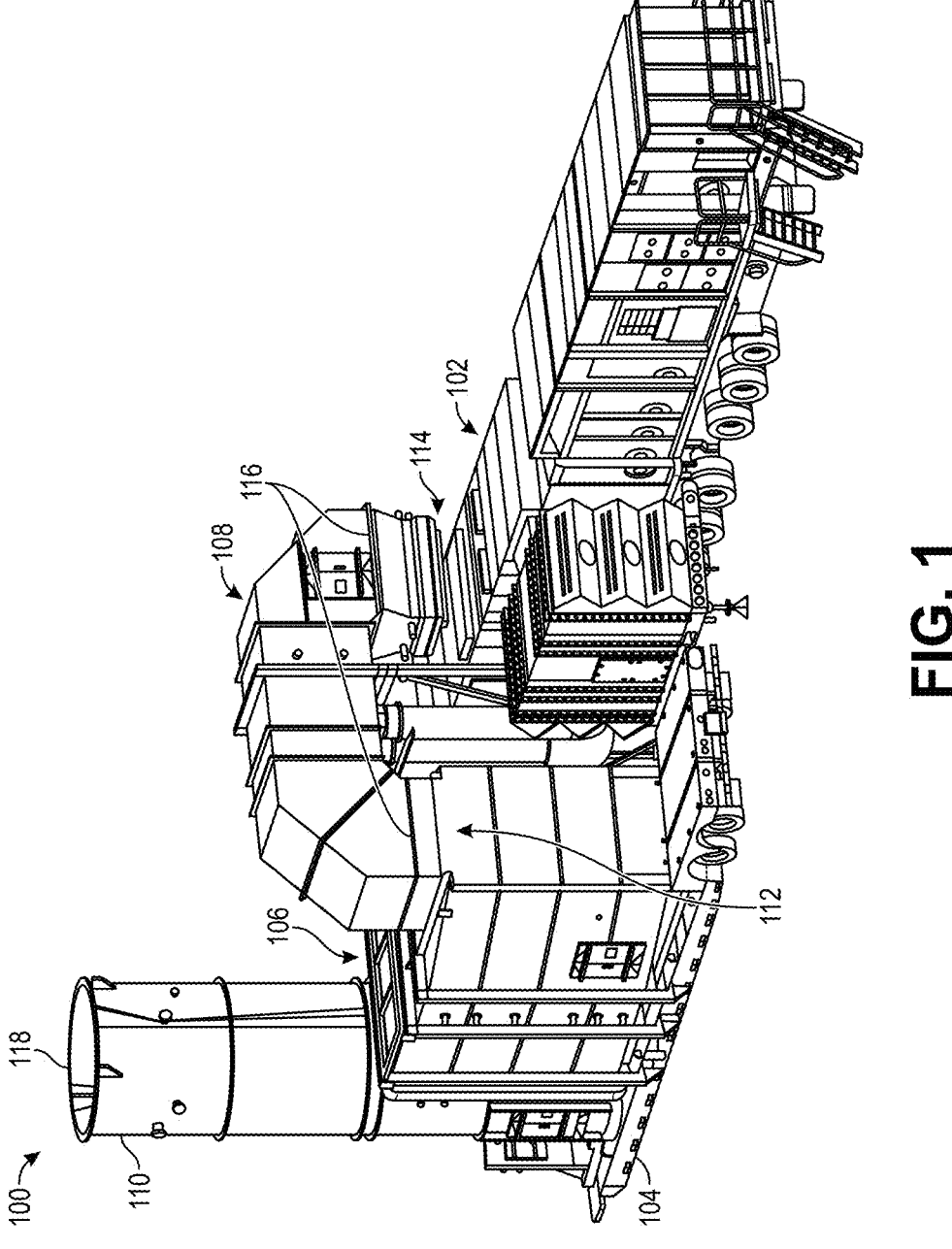
FIG. 1 illustrates a perspective view of an exemplary mobile selective catalytic reduction (SCR) system operably coupled with a gas turbine, according to an embodiment.

FIG. 1 illustrates a perspective view of an exemplary mobile selective catalytic reduction (SCR) system 100 operably coupled with a gas turbine 102, according to an embodiment. The SCR system 100 may include a base trailer 104, a selective catalytic reduction (SCR) duct assembly 106, a ducting interconnect 108, an exhaust stack or a selective catalytic reduction (SCR) stack 110, or any combination thereof. For example, as illustrated in FIG. 1, the SCR system 100 may include the base trailer 104, the SCR duct assembly 106 disposed on the base trailer 104, the ducting interconnect 108 operably coupling the SCR duct assembly 106 with the gas turbine 102, and the SCR stack 110 disposed on the base trailer 104 and operably and/or fluidly coupled with the SCR duct assembly 106.

Figure 2:
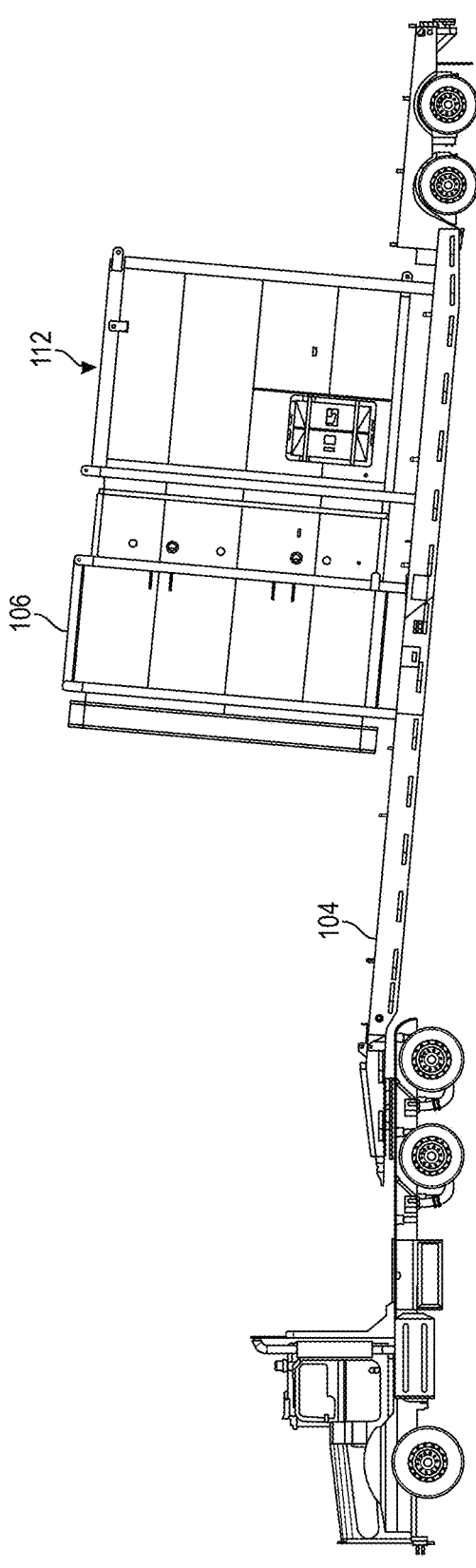
FIG. 2 illustrates a perspective view of the base trailer and the SCR duct assembly of FIG. 1, according to an embodiment.

FIG. 2 illustrates a perspective view of the base trailer 104 and the SCR duct assembly 106 of FIG. 1, according to an embodiment. In at least one embodiment, the base trailer 104 and the SCR duct assembly 106 may be removably coupled with one another. For example, the base trailer 104 and the SCR duct assembly 106 may be separated from one another. In another embodiment, the base trailer 104 and the SCR duct assembly 106 may be integrally assembled or built with one another. For example, the SCR duct assembly 106 may be permanently coupled with the base trailer 104. In another example, the SCR duct assembly 106 may be built or integrated with the base trailer 104. The base trailer 104 may include a self-leveling system (not shown) capable of or configured to facilitate the coupling between the SCR system 100 and/or the SCR duct assembly 106 thereof with the gas turbine 102. For example, the self-leveling system may be capable of or configured to facilitate the alignment, leveling (e.g., height adjustment), and/or the positioning of an inlet or a first inlet 112 (FIG. 1) of the SCR duct assembly 106 with an outlet or exhaust 114 of the gas turbine 102. In one embodiment, the self-leveling system may be or include a hydraulic system. It should be appreciated, however, that other leveling systems capable of or configured to align, level, or otherwise position the SCR system 100 with the gas turbine 102 are contemplated.

The SCR duct assembly 106 may be disposed on the base trailer 104 and configured to be operably coupled with the gas turbine 102 and receive exhaust from therefrom via the first inlet 112 thereof. The SCR duct assembly 106 may include one or more catalyst modules including a reductant (e.g., ammonia and/or urea). The catalyst modules may be capable of or configured to facilitate the reaction between NOx present in the exhaust and the reductant to form nitrogen and water vapor. In at least one embodiment, illustrated in FIG. 1, the SCR duct assembly 106 may be coupled with the gas turbine 102 via the ducting interconnect 108. As illustrated in FIG. 1, the ducting interconnect 108 may operably and/or fluidly couple the outlet or exhaust 114 of the gas turbine 102 with the first inlet 112 of the SCR duct assembly 106. The ducting interconnect 108 may include one or more quick connections 116 capable of or configured to facilitate the coupling with the SCR duct assembly 106 and/or the gas turbine 102. The quick connections 116 may further expedite the setup of the SCR system 100. The ducting interconnect 108 may also be configured to direct the exhaust from the output 114 of the gas turbine 102 to the SCR duct assembly 106 via the first inlet 112 thereof.

Figures 3A, 3B:
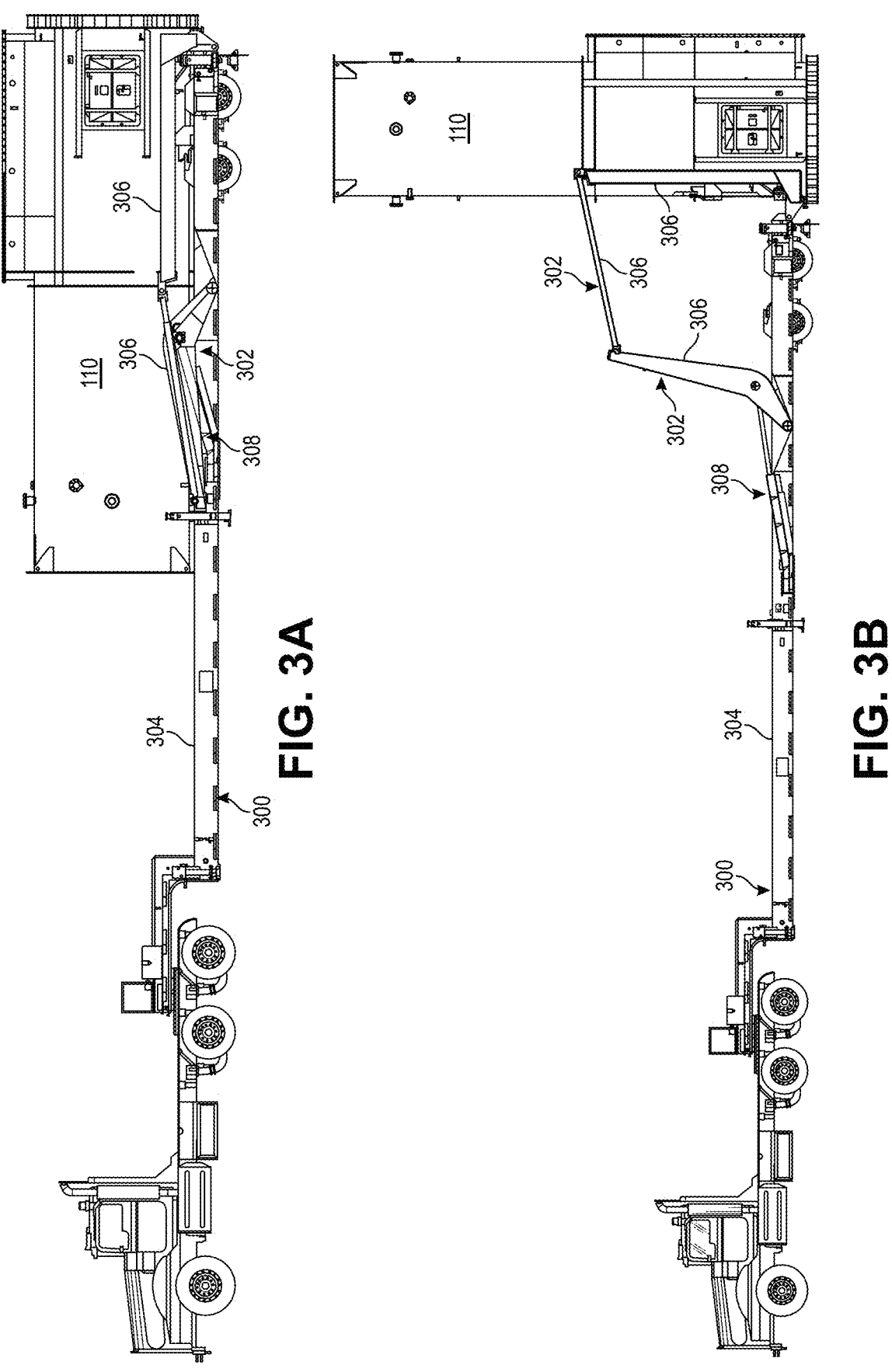
FIG. 3A illustrates an exemplary self-erecting trailer and the SCR stack of FIG. 1 in a horizontal orientation, according to an embodiment.
FIG. 3B illustrates the self-erecting trailer and the SCR stack of FIG. 1 in a vertical orientation, according to an embodiment.

FIGS. 3A and 3B illustrate an exemplary self-erecting trailer 300 and the SCR stack 110 of FIG. 1, according to an embodiment. As illustrated in FIG. 3A, the self-erecting trailer 300 may be capable of or configured to support and transport the SCR stack 110 in a horizontal orientation, thereby allowing and/or facilitating the transport of the SCR stack 110 on the self-erecting trailer 300 while maintaining compliance with regulations of the Department of Transportation (DOT). As illustrated in FIG. 3B, the self-erecting trailer 300 may be capable of or configured to position, move, lift, or otherwise dispose the SCR stack 110 in a vertical orientation. The self-erecting trailer 300 may be operably and/or detachably coupled with the SCR stack 110. In at least one embodiment, the self-erecting trailer 300 may be capable of or configured to dispose and/or position the SCR stack 110 on the base trailer 104, as illustrated in FIG. 1. The self-erecting trailer 300 may position the SCR stack 110 on the base trailer 104 without an external hoisting system, such as a detached or separate crane system.

In at least one embodiment, the self-erecting trailer 300 may include a hoisting system 302 configured to move or position the SCR stack 110 from a bed 304 of the self-erecting trailer 300 to the base trailer 104. The self-erecting trailer 300 may position the SCR stack 110 from the bed 304 to the base trailer 104 while simultaneously positioning the SCR stack 110 from the horizontal orientation (FIG. 3A) to the vertical orientation (FIG. 3B). The hoisting system 304 may be integrally built with the self-erecting trailer 300. In at least one embodiment, the hoisting system 304 may include one or more lever arms (three are shown 306) configured to position and/or support the SCR stack 110, and one or more biasing members 308 coupled with the lever arms 306. The biasing members 308 may be capable of or configured to apply a biasing force to the lever arms 306 to actuate the lever arms 306 and position or orient the SCR stack 110 (e.g., between the horizontal and vertical orientations). For example, the biasing members 308 may actuate the lever arms 306 to position the SCR stack 110 from the horizontal position on the bed 304 (FIG. 3A) to the vertical orientation (FIG. 3B). Illustrative biasing members 308 may be or include, but are not limited to, one or more pistons, hydraulics, or the like, or any combination thereof.

It should be appreciated that the ability to support the SCR stack 110 in the horizontal position on the bed 304 of the self-erecting trailer 300 during transport while maintaining the ability to both position the SCR stack 110 adjacent the SCR duct assembly 106 and orient the SCR stack 110 in the vertical orientation without an external hoisting system, provides a significant or exceptional advancement with respect to installing the SCR system 100 in remote locations. It should further be appreciated that the ability to position the SCR stack 110 in the vertical position improves efficiency and/or functionality of the SCR system 100. For example, providing the SCR stack 110 in the vertical position allows an exhaust 118 (FIG. 1) of the SCR stack 110 to be disposed at a relatively higher height or elevation than an inlet of the ducting interconnect 108, the exhaust 114 of the gas turbine 102, and/or the first inlet 112 of the SCR duct assembly 106. Providing the exhaust 118 of the SCR stack 110 at a relatively higher position prevents mixing of fluid (e.g., exhaust) from the outlet 118 of the SCR stack 110 with the first inlet 112, the inlet of the ducting interconnect 108, and/or the exhaust 114 of the gas turbine 102, thereby improving efficiency and functionality of the SCR system 100.

Figure 4:
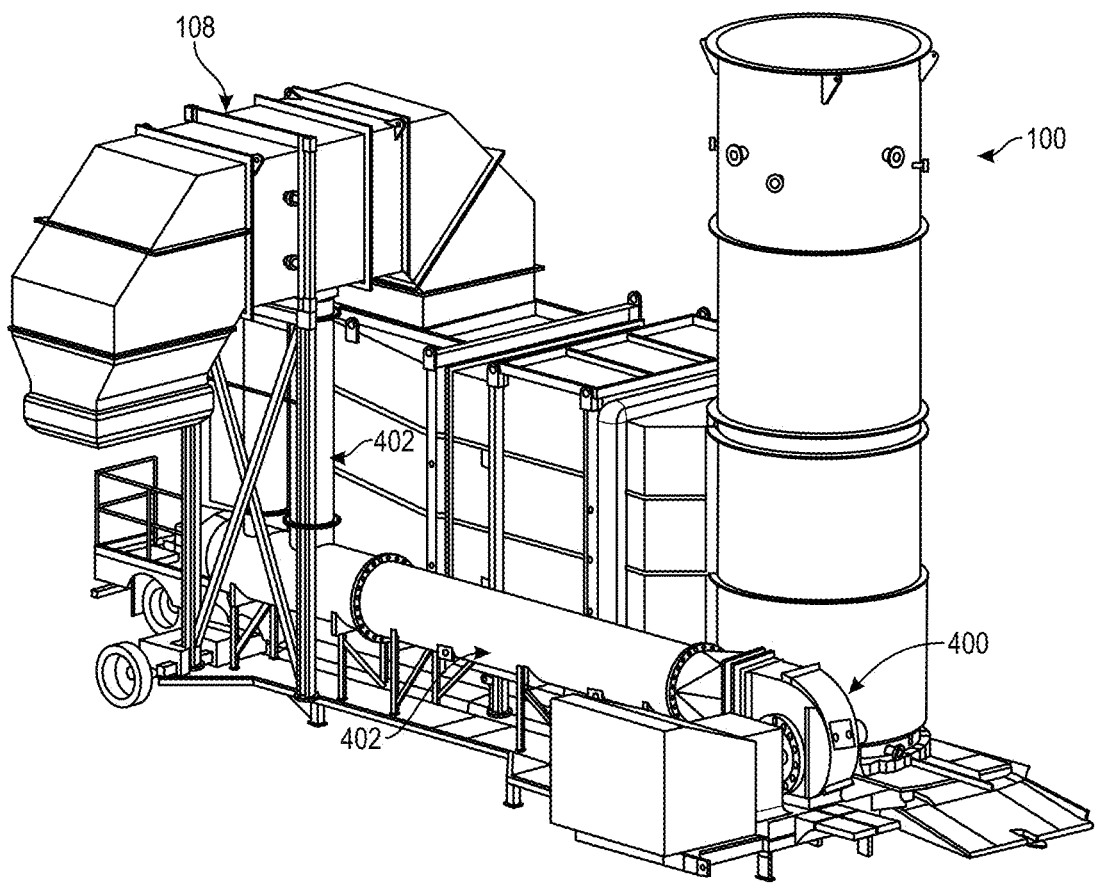
FIG. 4 illustrates a perspective view of the SCR system of FIG. 1 and a tempering air fan, according to an embodiment.

FIG. 4 illustrates a perspective view of the SCR system 100 of FIG. 1 including a tempering air fan 400, according to an embodiment. As illustrated in FIG. 4, the tempering air fan 400 may be configured to direct air from the atmosphere to the ducting interconnect 108 via one or more conduits 402. It should be appreciated that the catalyst modules of the SCR duct assembly 106 may be operated at a preferred temperature to improve performance and/or efficacy. As such, the tempering air fan 400 may be configured to direct air into the SCR duct assembly 106 to mix, combine, or otherwise contact the exhaust flow prior to reaching the catalyst modules. Mixing the air with the exhaust flow may reduce the overall temperature of the exhaust flow to thereby allow the ammonia to more efficiently reform the NOx into $N_2$ and $H_2O$. It should further be appreciated that utilizing the tempering air fan 400 as illustrated in FIG. 4 may improve mixing without additional baffles. For example, the ducting interconnect 108 may be relatively more narrow than the SCR duct assembly 106; and thus, the air circulating in the ducting interconnect 108 is more turbulent to enable improved tempering air mixing without the additional baffles.

Figure 5:
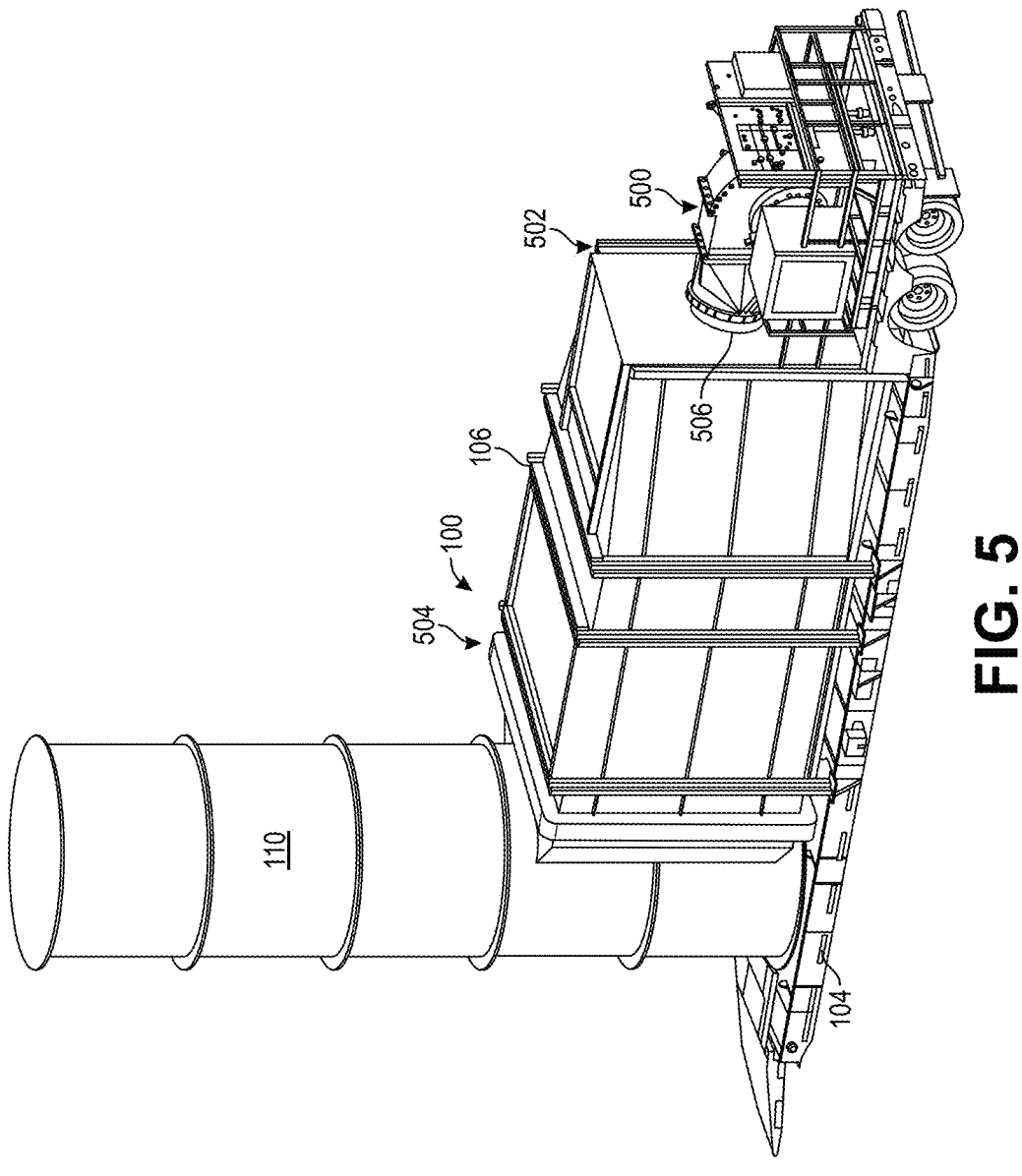
FIG. 5 illustrates a perspective view of the SCR system of FIG. 1 and a tempering air fan in another configuration, according to an embodiment.

FIG. 5 illustrates a perspective view of the SCR system 100 of FIG. 1 including a tempering air fan 500 in another configuration, according to an embodiment. In at least one embodiment, the tempering air fan 500 may be disposed on and/or coupled with the base trailer 104 and operably coupled with the SCR duct assembly 106. As illustrated in FIG. 5, the tempering air fan 500 may be disposed at or proximal a first end portion 502 thereof opposite a second end portion 504 thereof coupled with the SCR stack 110. The tempering air fan 500 may be fluidly coupled with a second inlet 506 of the SCR duct assembly 106 and configured to direct air from the atmosphere directly to the SCR duct assembly 106. In at least one embodiment, the SCR duct assembly 106 may include baffles (not shown) disposed therein and configured to receive air from the tempering air fan 500. The baffles may be configured to mix the air from the tempering air fan 500 with the exhaust from the gas turbine 102. The baffles may also be configured to ensure an even distribution of the reductant (e.g., ammonia, urea, etc.) before the flue gas enters the catalyst modules. It should be appreciated that utilizing the tempering air fan 500 in the configuration illustrated in FIG. 5 may provide one or more improvements. For example, the configuration illustrated in FIG. 5 provides the SCR system 100 with a reduced size and/or footprint as compared to the configuration illustrated in FIG. 4, which utilizes additional platforms and/or conduits 402. As illustrated in FIG. 5, the tempering air fan 500 shares and utilizes the base trailer 104 with the SCR duct assembly 106 and the SCR stack 110. It should further be appreciated that utilizing the tempering air fan 500 in the configuration illustrated in FIG. 5 is not intuitive as it may utilize additional baffling in the SCR duct assembly 106 and/or operate the tempering air fan 500 at a relatively reduced flow rate as compared to the tempering air fan 400 of FIG. 4.

Figure 6:
FIG. 6 illustrates a schematic view of an exemplary SCR system, according to an embodiment.
Figure 6:
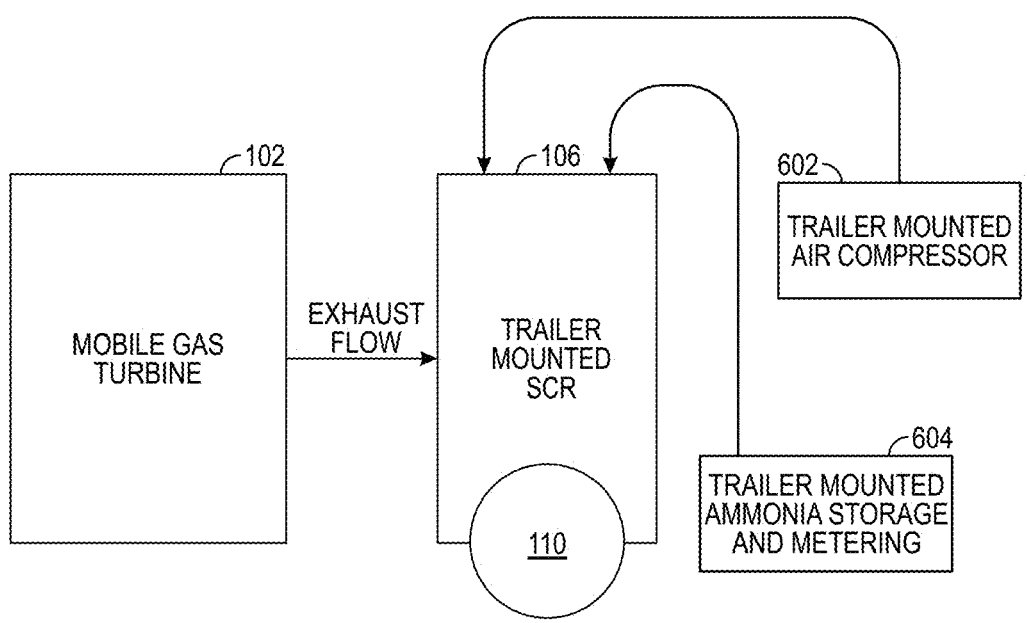

FIG. 6 illustrates a schematic view of an exemplary SCR system 600, according to an embodiment. The SCR system 600 may be similar in some respect to the SCR system 100 described above, and therefore, may be best understood with reference to the description of FIGS. 1-5, where like numerals designate like components and will not be described again in detail. As illustrated in FIG. 6, the SCR duct assembly 106 may be operably coupled with the gas turbine 102 and configured to receive the exhaust therefrom. The SCR system 600 may include a trailer mounted air compressor 602 operably coupled with the SCR duct assembly 106 and configured to direct compressed air to the SCR duct assembly 106. The SCR system 600 may also include a trailer mounted ammonia storage and metering system 604 operably coupled with the SCR duct assembly 106 and configured to direct ammonia to the SCR duct assembly 106. The trailer mounted air compressor 602 and/or the trailer mounted ammonia storage and metering system 604 may be capable of or configured to regulate a flow of the reductant (e.g., ammonia, urea, etc.) and/or dilution air to ensure accurate dosing into the exhaust stream in the SCR duct assembly 106. In at least one embodiment, the trailer mounted air compressor 602 and the trailer mounted ammonia storage and metering system 604 may be disposed on one or more trailers. For example, the trailer mounted air compressor 602 and the trailer mounted ammonia storage and metering system 604 may both be disposed on a single accessory trailer. In another example, the trailer mounted air compressor 602 may be disposed on a first accessory trailer and the trailer mounted ammonia storage and metering system 604 may be disposed on a second accessory trailer. In yet another example, the trailer mounted air compressor 602 and the trailer mounted ammonia storage and metering system 604 may both be disposed on the base trailer 104.

In at least one embodiment, the SCR system 100 may include a control system (not shown) capable of or configured to operate and/or monitor the SCR system 100 and/or one or more components thereof.

In at least one embodiment, the SCR system 100, 500 disclosed herein and/or the components thereof may be dimensionally configured to comply with DOT regulations and limits to allow transport on public thoroughfare. For example, the SCR system 100, 500 and the components thereof may be properly sized and/or weighted to meet the limits and regulations of the DOT. In another example, the respective weights of the SCR system 100, 500 and/or the components thereof may be managed to reduce axle requirements and the number of separate loads. In addition to the foregoing, the SCR system 100, 500 may be burned in and calibrated to the gas turbine such that on-site calibration, which is common in conventional SCR systems, is not needed or minimized at the remote location, thereby reducing the setup time. The SCR system 100, 500 disclosed herein are capable of being setup in a matter of days (e.g., 1-2 days, 1-3 days, etc.) or less than a week, as compared to conventional SCR systems that often require several weeks for setup. In at least one embodiment, minimal on-site calibration may be utilized after coupling the SCR system 100 with the gas turbine 102.

FIG. 7 illustrates a flowchart of a method 700 for operably coupling a mobile selective catalytic reduction (SCR) system with a gas turbine, according to an embodiment. An illustrative order of the method 700 is provided below; however, one or more portions of the method 700 may be performed in a different order, simultaneously, repeated, or omitted. In at least one embodiment, at least a portion of the method 700 may be performed using a computing system.

The method 700 may include transporting a selective catalytic reduction assembly on a base trailer to a gas turbine, as at 702. The base trailer may include a self-leveling system configured to facilitate the coupling between the SCR system and the gas turbine. The selective catalytic reduction assembly may be integrally built with or permanently coupled with the base trailer.

The method 700 may also include transporting a selective catalytic reduction stack on a self-erecting trailer to the gas turbine, as at 704. The selective catalytic reduction stack may be transported on the self-erecting trailer in a horizontal orientation.

The method 700 may further include disposing the selective catalytic reduction stack on the base trailer with the self-erecting trailer, as at 706. Disposing the selective catalytic reduction on the base trailer may include actuating a hoisting system integrally built with the self-erecting trailer to rotate the selective catalytic reduction stack from the horizontal orientation to a vertical orientation. Disposing the selective catalytic reduction on the base trailer may also include positioning the selective catalytic reduction stack on the base trailer in the vertical orientation.

The method 700 may also include fluidly coupling the selective catalytic reduction assembly with the gas turbine via a ducting interconnect, as at 708.

The method 700 may also include fluidly coupling the selective catalytic reduction stack with the selective catalytic reduction assembly, as at 710.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A mobile selective catalytic reduction (SCR) system for a gas turbine, comprising:
   a base trailer;
   a selective catalytic reduction duct assembly disposed on the base trailer and configured to be operably coupled with the gas turbine and receive exhaust from the gas turbine;
   a selective catalytic reduction stack configured to be disposed on the base trailer and operably coupled with the selective catalytic reduction duct assembly; and
   a self-erecting trailer detachably coupled with the selective catalytic reduction stack and configured to position the selective catalytic reduction stack on the base trailer.

2. The mobile SCR system of claim 1, wherein the selective catalytic reduction duct assembly is permanently coupled with the base trailer.

3. The mobile SCR system of claim 1, wherein the base trailer comprises a self-leveling system configured to facilitate the coupling between the SCR system and the gas turbine.

4. The mobile SCR system of claim 3, wherein the self-leveling system comprises a hydraulic system configured to adjust a height of a bed of the base trailer.

5. The mobile SCR system of claim 1, wherein the self-erecting trailer is configured to position the selective catalytic reduction stack on the base trailer without an external hoisting system.

6. The mobile SCR system of claim 1, wherein the self-erecting trailer is configured to position the selective catalytic reduction stack on the base trailer in a vertical orientation.

7. The mobile SCR system of claim 1, wherein the self-erecting trailer is configured to transport the selective catalytic reduction stack in a horizontal orientation.

8. The mobile SCR system of claim 1, further comprising a ducting interconnect operably coupled with an inlet of the selective catalytic reduction duct assembly and configured to fluidly couple the selective catalytic reduction duct assembly with the gas turbine.

9. The mobile SCR system of claim 1, further comprising a tempering air fan disposed on the base trailer and operably coupled with the selective catalytic reduction duct assembly.

10. The mobile SCR system of claim 1, wherein the gas turbine is a mobile gas turbine.

11. A mobile selective catalytic reduction (SCR) system for a gas turbine, comprising:
    a base trailer;
    a selective catalytic reduction duct assembly integrally built with the base trailer and configured to be operably coupled with the gas turbine and receive exhaust from the gas turbine via an inlet thereof;
    a selective catalytic reduction stack configured to be disposed on the base trailer and operably coupled with the selective catalytic reduction duct assembly; and
    a self-erecting trailer detachably coupled with the selective catalytic reduction stack and configured to position the selective catalytic reduction stack on the base trailer.

12. The mobile SCR system of claim 11, wherein the base trailer comprises a self-leveling system configured to facilitate the coupling between the SCR system and the gas turbine.

13. The mobile SCR system of claim 11, wherein the self-erecting trailer is configured to position the selective catalytic reduction stack on the base trailer without an external hoisting system.

14. The mobile SCR system of claim 11, wherein the self-erecting trailer comprises a hoisting system integrally built therewith, the hoisting system being configured to position the selective catalytic reduction stack from a horizontal orientation to a vertical orientation.

15. The mobile SCR system of claim 11, further comprising a ducting interconnect operably coupled with the inlet of the selective catalytic reduction duct assembly and configured to fluidly couple the selective catalytic reduction duct assembly with the gas turbine.

16. The mobile SCR system of claim 15, wherein an exhaust of the SCR stack is relatively higher than an inlet of the ducting interconnect and the inlet of the selective catalytic reduction duct assembly.

17. The mobile SCR system of claim 11, wherein the selective catalytic reduction duct assembly is permanently coupled with the base trailer.

18. The mobile SCR system of claim 11, further comprising:

a tempering air fan disposed on the base trailer and operably coupled with the selective catalytic reduction duct assembly, the tempering air fan being configured to direct air from the atmosphere to the selective catalytic reduction duct assembly via a second inlet thereof;

a ducting interconnect operably coupled with the inlet of the selective catalytic reduction duct assembly and configured to fluidly couple the selective catalytic reduction duct assembly with the gas turbine, wherein the ducting interconnect comprises one or more quick connections, and wherein the ducting interconnect is configured to direct the exhaust from the gas turbine to the selective catalytic reduction duct assembly via the inlet;

a trailer mounted air compressor configured to be operably coupled with the selective catalytic reduction duct assembly; and a trailer mounted ammonia storage and metering system operably coupled with the selective catalytic reduction duct assembly.

19. The mobile SCR system of claim 18, wherein:

an exhaust of the selective catalytic reduction stack is relatively higher than an inlet of the ducting interconnect and/or the inlet of the selective catalytic reduction duct assembly;

the self-erecting trailer is configured to position the selective catalytic reduction stack on the base trailer without an external hoisting system;

the self-erecting trailer is configured to position the selective catalytic reduction stack on the base trailer in a vertical orientation; and the self-erecting trailer is configured to transport the selective catalytic reduction stack in a horizontal orientation.

20. A method for operably coupling a mobile selective catalytic reduction (SCR) system with a gas turbine, the method comprising:

transporting a selective catalytic reduction assembly on a base trailer to the gas turbine, wherein the base trailer comprises a self-leveling system configured to facilitate the coupling between the SCR system and the gas turbine, and wherein the selective catalytic reduction assembly is integrally built with or permanently coupled with the base trailer;

transporting a selective catalytic reduction stack on a self-erecting trailer to the gas turbine, wherein the selective catalytic reduction stack is transported on the self-erecting trailer in a horizontal orientation;

disposing the selective catalytic reduction stack on the base trailer with the self-erecting trailer, wherein disposing the selective catalytic reduction on the base trailer comprises:

actuating a hoisting system integrally built with the self-erecting trailer to rotate the selective catalytic reduction stack from the horizontal orientation to a vertical orientation; and positioning the selective catalytic reduction stack on the base trailer in the vertical orientation;

fluidly coupling the selective catalytic reduction assembly with the gas turbine via a ducting interconnect; and fluidly coupling the selective catalytic reduction stack with the selective catalytic reduction assembly.

* * * * *